Figure 1:
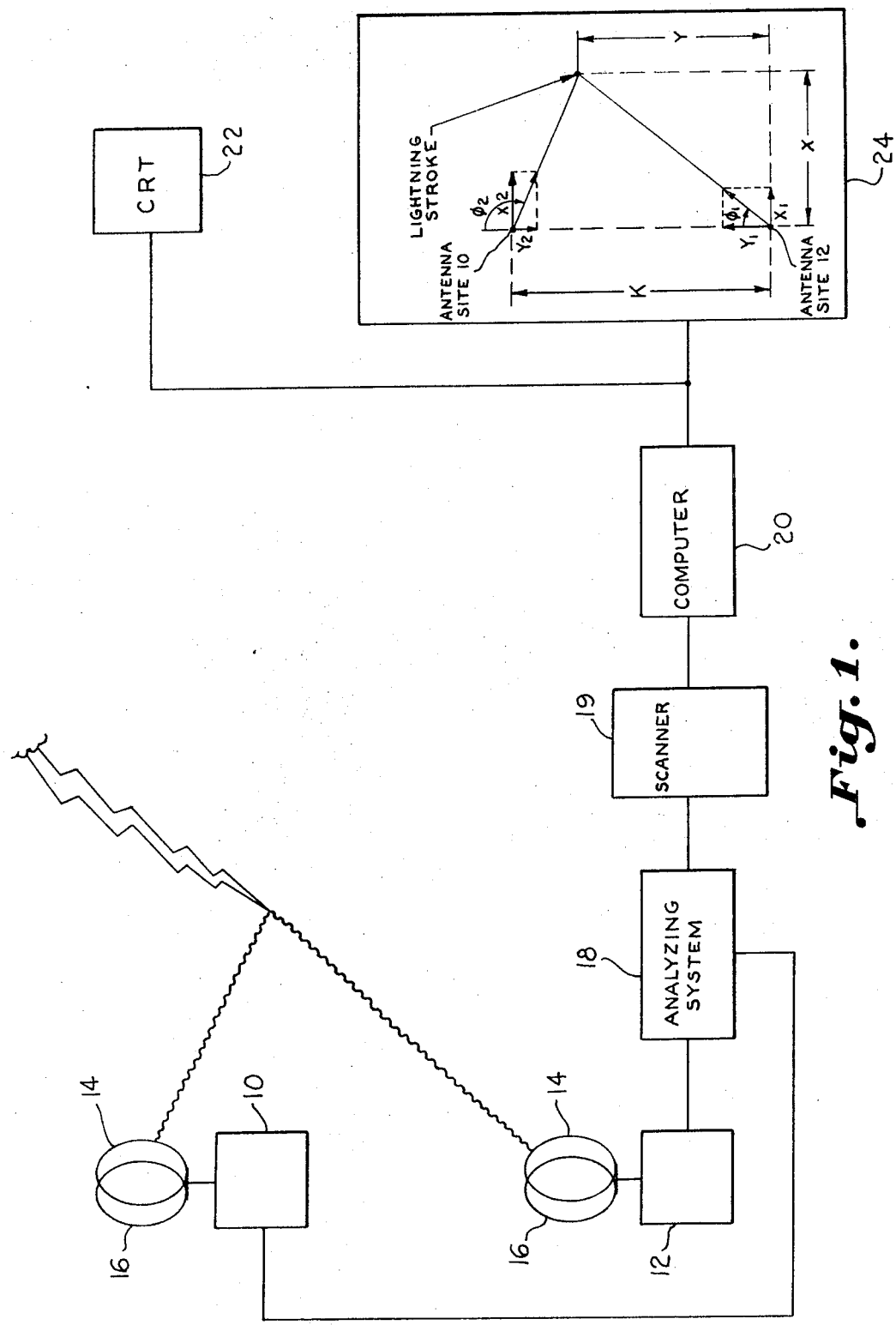

United States Patent [19]
Wojtasinski et al.

[11] 3,754,263
[45] Aug. 21, 1973

[54] LIGHTNING TRACKING SYSTEM

[75] Inventors: Ronald J. Wojtasinski, Cocoa Beach; James H. Jones, Titusville, both of Fla.

[73] Assignee: The United States of America as represented by the Administrator of the National Aeronautics and Space Administration, Washington, D.C.

[22] Filed: Jan. 28, 1972

[21] Appl. No.: 221,714

[52] U.S. Cl. ......................... 343/112 R, 343/113 R
[51] Int. Cl. ............................................. G01s 3/02
[58] Field of Search ................. 343/112 R, 112 C, 343/119, 122, 113 R; 324/4

[56] References Cited
UNITED STATES PATENTS
2,684,474   7/1954   Kass ............................... 343/112 R
1,759,938   5/1930   Dean .............................. 343/113 R Primary Examiner—Benjamin A. Borchelt
Assistant Examiner—S. C. Buczinski
Attorney—James O. Harrell, John R. Manning et al.

[57] ABSTRACT

A system for locating lightning strikes by developing the coordinates of a pair of lines, each of which is produced at a reference sensing station. At each station there are a pair of directional antennas which produce analog signals responsive to a lightning stroke. These analog signals are fed to a pair of integrators which integrate the signals for a predetermined period of time so as to produce the X and Y co-ordinate of a particular line. The analog signals are also fed through a square rooter, a Schmitt trigger circuit, and flip-flops to produce pulses for starting and stopping the integrators. The system at the remote station is similar to that at the central station and is tied to the circuitry at the central station through logic circuits to minimize the chance of error from spurious signals. Computers, printers, and plotters are utilized to plot the exact location of the lightning stroke.

5 Claims, 2 Drawing Figures

LIGHTNING TRACKING SYSTEM

This invention described herein was made by employees of the United States Government, and may be manufactured and used by or for The Government for Governmental purposes without the payment of any royalties thereon or therefor.

This invention relates to a system for locating lightning strokes, and more particularly to a system which locates the lightning strokes by producing the coordinates of at least a pair of lines which indicate the location of the stroke of lightning at the intersection of the lines.

On Nov. 14, 1969, the Apollo XII Saturn rocket carrying astronauts, Charles Conrad, Jr., Richard F. Gordon, Jr., and Allen L. Beam was struck by a bolt of lightning blacking out communication during those critical seconds just after lift-off. This event occurred, although no lightning had been observed in the immediate area during the 6 hours prededing the launch. This episode emphasized the potential hazards of lightning to astronatus, launch crew personnel and equipment during launch operations.

One problem inherent in systems developed heretofore is that they may be activated by spurious signals producing false information as to the location of lightning strokes. One of the primary purposes of the subject invention is to locate lightning strokes by pairing-up the appropriate signals appearing at different sites. One way of accomplishing this is designing the circuitry so that the signal detected at the remote station must occur within approximately 100 microseconds of the signal received at the primary station. This particular delay of 100 microseconds has been determined mathematically for a remote station which is approximately seven and one-half miles from the central station. Any spurious signals being received outside of this period of time would be rejected by the system. Another advantage of the subject system is that it utilizes the signals generated by the lightning for synchronizing the operation of the integrators utilized therein.

In accordance with the present invention it has been found that difficulties encountered in locating lightning strokes may be overcome by providing a novel lightning sensing system. This system, when used for monitoring lightning strokes includes the following basic parts: (1) A first pair of directional antenna means positioned at right-angles to each other located at a first sensing or central station for generating a first pair of analog signals responsive to a lightning stroke, (2) a second pair of directional antenna means positioned at right-angles to each other located at a second remote sensing station for generating a second pair of analog signals responsive to the lightning stroke, (3) a first means for combining the first pair of analog signals to produce a first RMS composite cycling signal, (4) each of the integrators of the first pair of integrators being connected to one of the directional antennas of the first pair of directional antennas for recieving and integrating the analog signals from the first pair of directional antennas for developing an X and a Y co-ordinate of a line, (5) a first pulse producing means coupled between the first means for combining the first pair of analog signals and the first pair of integrators for receiving the first composite signal and generating a pair of time-delayed pulses which are utilized for enabling and disenabling the first pair of integrators, (6) a second pair of integrators, each being connected to one of the directional antennas of the second pair of directional antennas for recieving and integrating the analog signals from the second pair of directional antennas for developing an $X_2$ and $Y_2$ co-ordinate of another line, (7) a second means for combining the second pair of analog signals to produce a second composite cycling signal, (8) a second pulse producing means coupled between the second means for combining the second analog signal and the second pair of integrators for receiving the second composite signal and generating a second pair of time-delayed pulses which are utilized for enabling and disenabling the second pair of integrators, (9) means coupled between the second pulse producing means and the first pair of integrators for holding the first pair of integrators in an enable integrating state for a predetermined duration responsive to the second pair of time-delayed pulses and, (10) a logic circuit provided for insuring that the signals are received at the central or reference station prior to the signals being received at the remote station.

Thus, the first pair of integrators produce signals indicating the $X_1$ and $Y_1$ co-ordinates of a line and the second pair of integrators produces signals indicating the $X_2$ and $Y_2$ co-ordinates of a second line and the intersection of the first and second line indicates the location of the lightning strike.

Accordingly, it is an important object of the present invention to provide a system for sensing and locating lightning.

Another important object of the present invention is to provide a system for sensing and determining the location of lightning strikes which rejects spurious signals.

Another important object of the present invention is to provide a system for sensing and locating lightning strikes which utilizes the signal produced by the lightning strike for synchronizing various components in the system, such as integrators which integrate the signals to produce the X and Y components of the lines.

Figure 2:
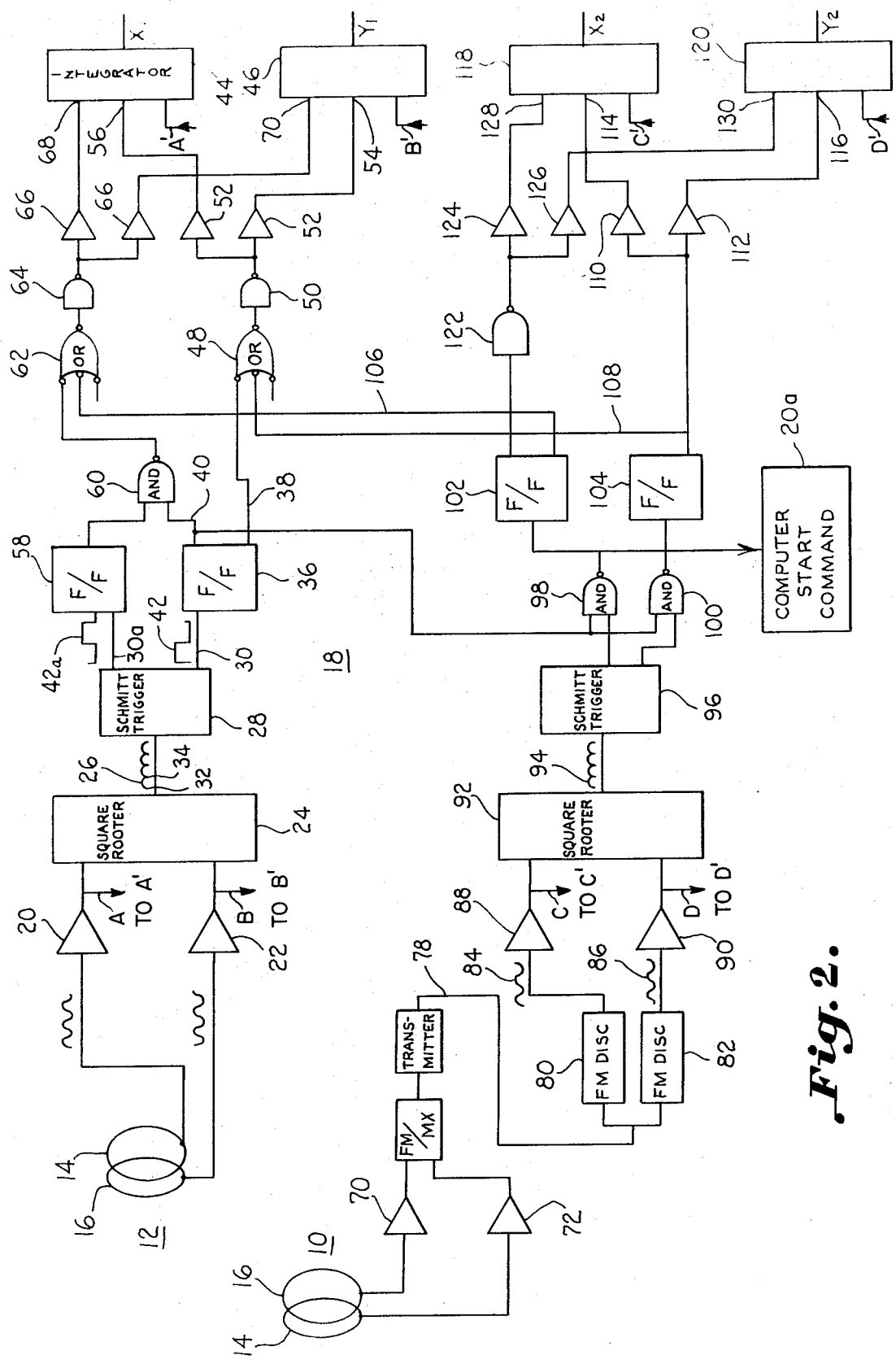

Other objects and advantages of this invention will become more apparent from a reading of the following detailed description and appended claims taken in conjunction with the accompanying drawings wherein:

FIG. 1 is a diagrammatic view showing the system constructed in accordance with the present invention sensing and plotting the location of a lightning strike, and FIG. 2 is a schematic diagram illustrating the analyzing portion of the system which produces the X and Y co-ordinates of lines used to identify the location of a lightning strike.

Referring in more detail to FIG. 1 of the drawings, there is illustrated a pair of antenna systems 10 and 12, respectively. The antenna system 10 is located at a remote station and includes a pair of directional antennas 14 and 16 which are crossed at right-angles to each other and oriented to the four points of the compass. The loop antennas 14 and 16 are used to abstract electromagnetic energy from the sferic in the very low frequency portion of the frequency spectrum of the lightning strike. The directional pattern of the loop antennas 14 and 16 is proportional to the cosine of $\theta$, where $\theta$ is the angle which describes the direction of travel of the wave with respect to the plane of the loop. The antenna system 12 which is located at the control center is identical to that of 10 and includes the loop antennas 14 and 16. The signals received by the two antenna systems 10 and 12 are fed through an analyzing system 18 which is shown in more detail in FIG. 2, which produces positive or negative X and Y signals ($X_1$, $Y_1$ and $X_2$, $Y_2$) that are obtained from each of the two sferic sites 10 and 12, respectively. Since the base line distance between the two sferic sites is known, the locating of the lightning stroke can be computed by a computer 20 using the following relationships:

$$X = (K X_1 Y_2)/(X_2 Y_1 - X_1 Y_2)$$

$$Y = (K X_2 Y_1)/(X_2 Y_1 - X_1 Y_2)$$

Where $X$ and $Y$ are the co-ordinate distances, respectively, from sferic sites No. 12 and $K$ is the distance between the two sferic sites. The computer may be utilized to feed the co-ordinate information to various pieces of equipment, such as a cathode ray display tube, an X and Y plotter, storage equipment, etc. Normally, after the location of the lightning stroke has been computed by the computer 20 such is automatically plotted on a cathode ray tube 22 and an XY plotter 24.

Referring in more detail to FIG. 2 of the drawings, there is disclosed in detail the analyzing system, generally designated by the reference character 18. The antennas illustrated at site No. 12 are located closely adjacent the analyzing system 18, whereas, the antennas 14 and 16 illustrated at the site 10 are located at a remote site, which in one particular application, is seven and one-half miles from the analyzing system. The antennas 14 and 16 will detect a lightning strike and generate analog signals having a directional characteristic. It is noted that the antennas 14 and 16 are at right-angles to each other. The analog signals are fed through variable gain amplifiers 20 and 22 into a square rooter 24. The square rooter combines the first pair of analog signals to produce a composite instantaneous RMS cycling signal 26. The output of the square rooter is fed into a Schmitt trigger circuit 28 which generates a pulse on its output 30 at the leading edge 32 of the RMS signal and produces another positive pulse on its other output terminal 30a at the trailing edge 34 of the RMS signals. Connected to the output terminal 30 of the Schmitt trigger circuit 22 is a long delay flip-flop 36 which has a pair of output terminals 38 and 40, respectively. The purpose of generating pulses 42 and 42a on the output terminals 30 and 30a, respectively, of the Schmitt trigger circuit 28 is to provide control pulses for starting and stopping integrators 44 and 46, respectively. As previously mentioned, the first control pulse 42 causes flip-flop 36 to change states generating a pulse which is fed through an OR gate 48, an invertor 50, amplifiers 52 to control terminals 54 and 56 of integrators 46 and 44, respectively. These signals enable the integrators to begin integrating. It is noted that the analog signal being produced by the anenna 14 at the site 12 after passing through the amplifier 20 is fed directly to the integrator 44 via leads labeled A, A' for integration. The leads labeled A, A', B, B', C, C' and D, D' indicate that the leads are continuous between common characters. The other control pulse 42A on the output terminal 30a of the Schmitt trigger is fed through a long-delay flip-flop 58 and AND gate 60, or OR gate 62, an invertor 64, amplifiers 66 to control input terminals 68 and 70, respectively, of the integrators 44 and 46 for stopping the integrator. The integrators 44 and 46, in turn, produce a DC signal on its outputs corresponding to the $X_1$ and $Y_1$ components of a line which is used to define the exact location of the lightning strike when plotted to produce an intersect with another line whose $X_2$ and $Y_2$ components are produced by the antenna system 10 located at the remote station.

The purpose of the AND gate 60 between the flip-flops 36 and 58 and the OR gate 62 is to clean up the trailing edge of the signals produced by the flip-flops 58 and 36 so as to minimize the chance of spurious signals effecting the operation of the integrators.

The signals at the remote station 10 developed by the lightning stroke are detected by the antennas 14 and 16, and are fed through a pair of remote controlled amplifiers 70 and 72 which are set for the appropriate amplification for transmission, and then fed into a frequency multiplexer and transmitter 74 and 76 to be transmittee back to the central station over a video cable 78 to a pair of frequency discriminators 80 and 82, which return the FM information back to the analog signals 84 and 86.

The second pair of analog signals 84 and 86 are amplified by variable gain amplifiers 88 and 90 and fed into a square rooter 92 which generates an instantaneous composite RMS signal 94. The RMS signal is fed into a Schmitt trigger 96 which generates a pair of pulses identical to those generated by the Schmitt trigger 28. These control pulses are fed into AND gates 98 and 100 along with an output pulse being received from flip-flop 36 on output terminal 40 thereof. The AND gates 98 and 100 insure that a control signal is generated by flip-flop 36 from the same lightning stroke within 100 microseconds of the signal received from the remote antenna system 10. The output of the AND gates 98 and 100 are fed into five second delay flip-flops 102 and 104, respectively. The purpose of the five second holding signal on the output of flip-flops 102 and 104 is to supply a signal through leads 106 and 108, respectively, to OR gates 62 and 64 of the system processing the signals from the local site 12. This holding signal flows through leads 106 and 108, OR gate 62, to the control inputs 68 and 70 of the integrators 54 and 56 to hold the DC output of the integrators for a duration of five seconds. This is to allow the computer sufficient time to command a scanner 19 to scan the outputs of the integrating circuits.

The output of flip-flop 104 is also fed through amplifiers 110 and 111 to control inputs 114 and 116 of integrators 118 and 120, respectively, to start the integrators integrating. It is noted that the analog signals being fed through amplifiers 88 and 90 are fed directly to a respective integrators 118 and 120 as shown in the drawings. The other output of flip-flop 102 is fed through an invertor 122, a pair of amplifiers 124 and 126 to control input 128 and 130, respectively, of the integrators 118 and 120 to stop the integration after the five second time-delay.

The computer start command 20a is taken at the output of AND gate 98 for causing the computer to start the scanner 19 (see FIG. 1) scanning the output terminals of the integrators 44, 46, 118 and 120. The output signals on the integrators 44 and 46 represent the $X_1$ and $Y_1$ co-ordinates of one line, whereas, the output signals from integrators 118 and 120 represent the X2 and Y2 components of another line. These signals are processed through a conventional computer 20 fed into a conventional cathode ray tube 22 and plotter 24 to plot the lines, such as illustrated in FIG. 1. The inversection of the two lines represent the location of the lightning stroke.

If a more accurate system is desired, several lines could be created similar to the two created by the antenna systems 10 and 12 so that the intersection of the lines would be more definitely defined. The additional processing circuitry for the other sites would be tied into the logic circuitry associated with site 12 in the same manner as the logic circuitry of remote site 10 is tied therein.

While a preferred embodiment of the invention has been described using specific terms, such description is for illustrative purposes only, and it is to be understood that changes and variations may be made without departing from the spirit or scope of the following claims.

We claim:

1. A system for locating lightning strikes by developing the coordinates of a pair of lines, each of which is produced at a sensing station so that the intersection of said pair of lines indicate the location of said lightning strike comprising:
   A. a first pair of directional antenna means positioned at a right angle to each other located at a first sensing station for generating a first pair of analog signals responsive to a lightning strike,
   B. a second pair of directional antenna means positioned at right angles to each other located at a second remote sensing station for generating a second pair of analog signals responsive to a lightning strike,
   C. first means for combining said first pair of analog signals to produce a first composite cycling signal,
   D. a first pair of integrators each being connected to one of said directional antennas of said first pair of directional antennas for receiving and integrating said analog signals from said first pair of directional antennas for developing an X and a Y coordinate of a line,
   E. a first pulse producing means coupled between said first means for combining said first pair of analog signals and said first pair of integrators for receiving said first composite signal and generating a first pair of time-delayed pulses, one of said first pair of pulses enabling said first pair of integrators and the other disenabling said first pair of integrators,
   F. a second pair of integrators each being connected to one of said directional antennas of said second pair of directional antennas for receiving and integrating said analog signals from said second pair of directional antennas for developing an X and a Y coordinate of a line,
   G. second means for combining said second pair of analog signals to produce a second composite cycling signal, and
   H. a second pulse producing means coupled between said second means for combining said second analog signals and said second pair of integrators for receiving said second composite signal and generating a second pair of time-delayed pulses, one of said second pair of pulses enabling said second pair of integrators and the other pulse disenabling said second pair of integrators,
   whereby said first pair of integrators produce signals indicating the X and Y co-ordinates of a first line and said second pair of integrators produce signals indicating the X and Y co-ordinates of a second line and the intersection of said first and second lines indicates the location of said lightning strike.

2. The system as set forth in claim 1 further comprising:
   A. means coupled between said second pulse producing means and said first pair of integrators for holding said first pair of integrators in an enabled integrating state for a predetermined duration responsive to said second pair of time delayed pulses.

3. The system as set forth in claim 1 further comprising:
   A. a pair of AND gates each having at least a pair of input terminals and an output terminal,
   B. one of said input terminals of each of said AND gates being coupled to said second pulse producing means,
   C. the other of said input terminals of each of said AND gates being coupled to said first pulse producing means, and
   D. said output terminals of said AND gates being coupled to said second pair of integrators so that said second pair of integrators are not enabled unless both said first and second pairs of directional antennas are generating analog signals responsive to a lightning strike.

4. The system as set forth in claim 1, wherein said first pulse producing means includes:
   A. A schmitt trigger circuit having an input terminal coupled to the output of said means for combining said first pair of analog signals;
   B. said Schmitt trigger circuit having a pair of output terminals and,
   C. a flip-flop coupled to each of said output terminals of said Schmitt trigger circuit for generating time-delayed signals responsive to said composite signal.

5. The system as set forth in claim 1, wherein first means for combining said first pair of analog signals includes:
   A. a square rooter having a pair of input terminals and an output terminal, and
   B. means for coupling said first pair of analog signals to said input terminals of said square rooter for producing an instantaneous composite RMS signal on said output terminal of said square rooter.

* * * * *